(12) United States Patent
Sasikumar et al.

(10) Patent No.: US 11,694,376 B2
(45) Date of Patent: Jul. 4, 2023

(54) INTUITIVE 3D TRANSFORMATIONS FOR 2D GRAPHICS

(71) Applicant: ADOBE INC., San Jose, CA (US)

(72) Inventors: Anirudh Sasikumar, Dublin, CA (US); Talin Chris Wadsworth, Castro Valley, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/073,815

(22) Filed: Oct. 19, 2020

(65) Prior Publication Data

US 2022/0122303 A1 Apr. 21, 2022

(51) Int. Cl.
*G06T 11/60* (2006.01)
*G06T 3/20* (2006.01)
*G06T 3/60* (2006.01)

(52) U.S. Cl.
CPC .............. *G06T 11/60* (2013.01); *G06T 3/20* (2013.01); *G06T 3/60* (2013.01); *G06T 2200/24* (2013.01)

(58) Field of Classification Search
CPC ... G06T 11/60; G06T 3/20; G06T 3/60; G06T 2200/24; G06T 3/00
See application file for complete search history.

(56) References Cited

U.S. PATENT DOCUMENTS

| | | | | |
|---|---|---|---|---|
| 5,588,098 A | * | 12/1996 | Chen | G06F 3/04845 345/653 |
| 8,970,629 B2 | * | 3/2015 | Kim | G06F 3/04842 345/662 |
| 9,323,351 B2 | * | 4/2016 | Miyazawa | G06F 3/0346 |
| 9,606,584 B1 | * | 3/2017 | Fram | G06F 3/0482 |
| 9,754,398 B1 | * | 9/2017 | Cardwell | G06F 1/1694 |
| 10,649,615 B2 | * | 5/2020 | Ptak | G06F 3/04845 |
| 2008/0034289 A1 | * | 2/2008 | Doepke | G06F 3/0482 715/700 |
| 2010/0333037 A1 | * | 12/2010 | Pavlovski | G06F 3/0481 715/848 |
| 2011/0164163 A1 | * | 7/2011 | Bilbrey | H04N 23/632 348/E5.022 |
| 2013/0195376 A1 | * | 8/2013 | Baheti | G06V 30/18095 382/289 |

(Continued)

FOREIGN PATENT DOCUMENTS

JP  2001503896 A  *  3/2001

*Primary Examiner* — Chante E Harrison
(74) *Attorney, Agent, or Firm* — Shook, Hardy & Bacon L.L.P.

(57) ABSTRACT

A graphics design system provides intuitive 3D transformations for 2D objects. A user interface element is presented on 2D object or group of 2D objects. The user interface element comprises a combination of components for applying different 3D transformations, including at least one rotation component for rotating a 2D object or group of 2D objects around an axis and at least one translation component for translating the 2D object or group of 2D objects along at least one axis. 3D transformations are non-destructive and performed relative to axes local to a 2D object or 2D objects. When a 2D object or group of 2D objects is rotated around an axis, the other axes are rotated. As such, subsequent rotations and translations are performed based on the rotated axes. Additionally, editing actions associated with rotated 2D object(s) are performed in the rotated x-y plane of the rotated 2D object(s).

20 Claims, 12 Drawing Sheets

(56) References Cited

U.S. PATENT DOCUMENTS

| | | | |
|---|---|---|---|
| 2013/0222385 A1* | 8/2013 | Dorsey | G06T 19/00 345/427 |
| 2013/0235071 A1* | 9/2013 | Ubillos | G06F 3/04842 345/600 |
| 2015/0036944 A1* | 2/2015 | Restrepo | G06T 5/20 382/264 |
| 2015/0074573 A1* | 3/2015 | Teshima | G06F 3/04847 715/765 |
| 2016/0078595 A1* | 3/2016 | Ogino | G06F 3/04883 345/619 |
| 2021/0011556 A1* | 1/2021 | Atlas | G06F 3/011 |

* cited by examiner

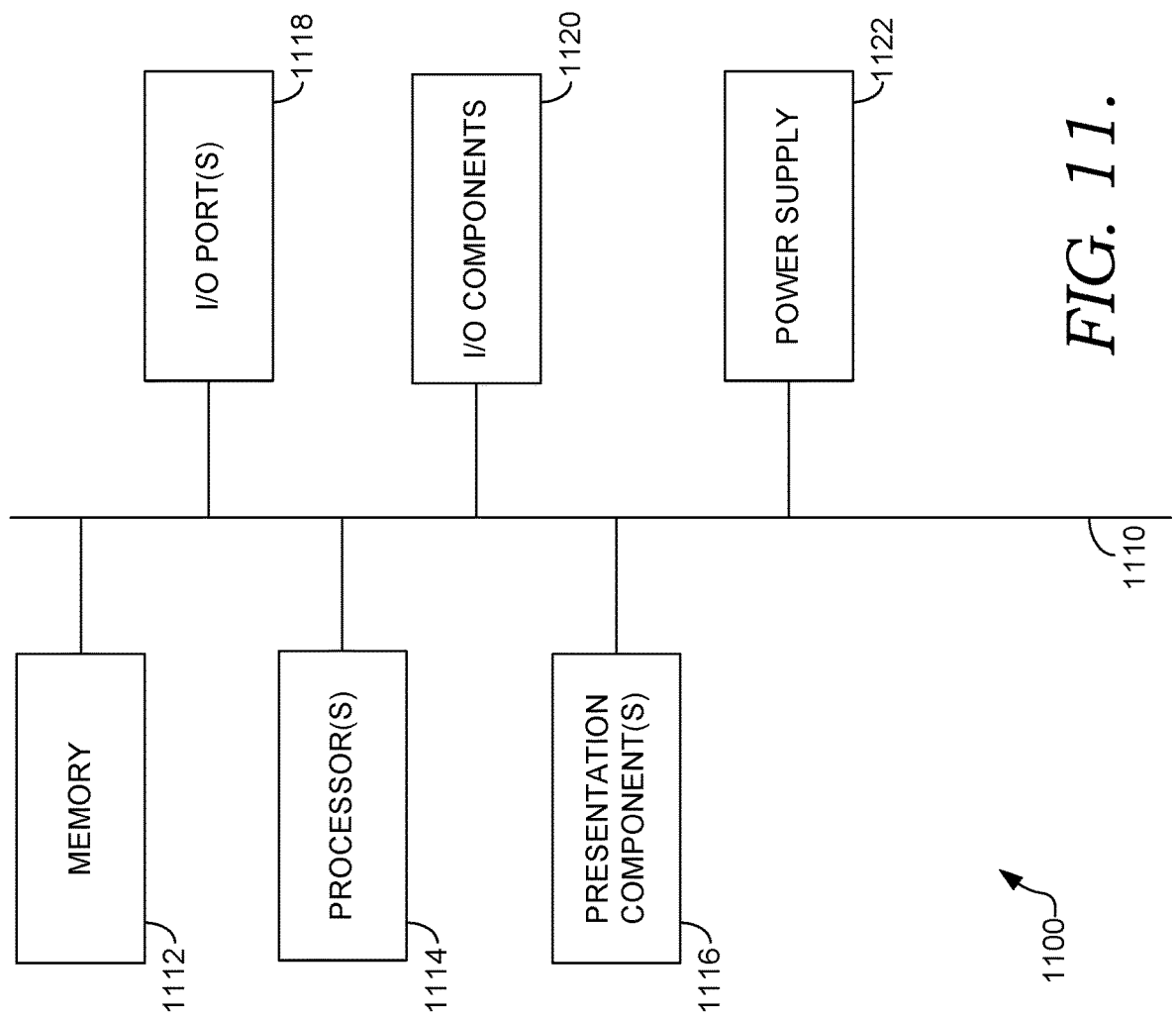

INTUITIVE 3D TRANSFORMATIONS FOR 2D GRAPHICS

BACKGROUND

A number of graphics editing and design programs are available that enable users to design two-dimensional (2D) graphics. These graphics programs are often used by designers to build user interfaces (UIs) and user experiences (UXs) for a variety of applications, such as web and mobile apps, for instance. While many graphics programs provide extensive capabilities to generate rich graphics designs, designers often want to add depth and dimensionality to their designs in order to communicate and orient the user within their experience. However, three-dimensional (3D) transformations in 2D design tools are often destructive to the fidelity of their designs, thereby hampering expressiveness. While designers can attempt to use 3D graphics programs, the 3D transformations in such programs are not intuitive or accessible to 2D designers due to the complexity of existing 3D tools. This provides a higher barrier to entry for 2D UI/UX designers into emerging platforms like augmented reality. Additionally, designers may need to create 2D graphics in one graphics program and then transport the 2D graphics to a 3D graphics program to apply 3D transformations.

SUMMARY

Embodiments of the present invention relate to, among other things, a graphics design system that enables intuitive 3D transformations for 2D objects. The graphics design system provides a user interface element on a 2D object or group of 2D objects for applying 3D transformations to the 2D object or group of 2D objects. The user interface element comprises a combination of components for applying different 3D transformations, including at least one rotation component for rotating a 2D object or group of 2D objects around an axis and at least one translation component for translating the 2D object or group of 2D objects along at least one axis. 3D transformations are applied based on selection of a component of the user interface element via an input device and movement of the input device after the selection.

3D transformations are performed relative to axes local to a 2D object or 2D objects as opposed to global axes. When a 2D object or group of 2D objects is rotated around an axis, the other axes are rotated. As such, subsequent rotations and translations are performed based on the rotated axes. Additionally, rotation causes the x-y plane of the 2D object(s) to be rotated. Any editing actions associated with the 2D object(s) are performed in the rotated x-y plane.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 11 is a block diagram of an exemplary computing environment suitable for use in implementations of the present disclosure.

DETAILED DESCRIPTION

Definitions

Figure 1:
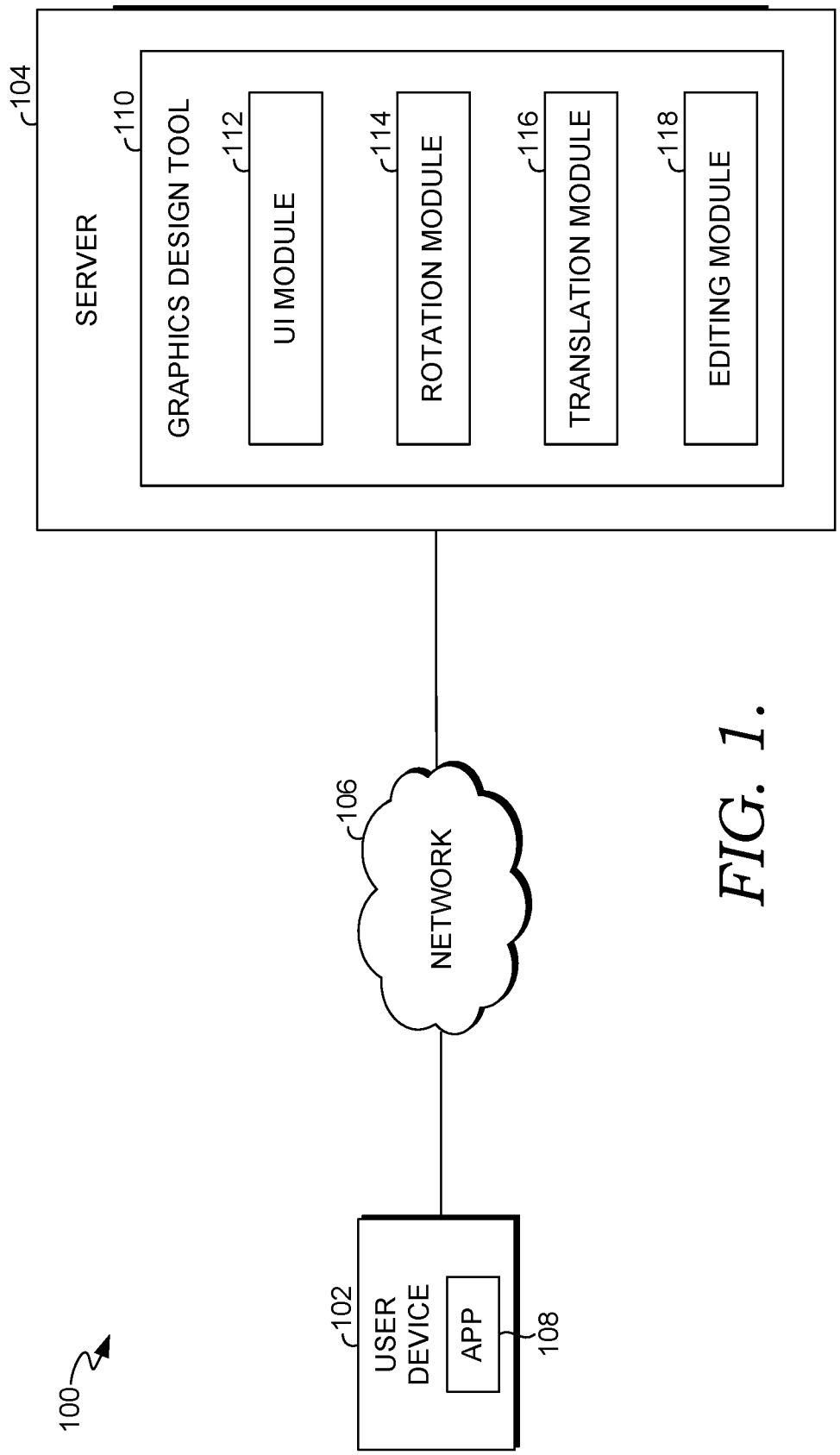
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "2D object" refers to a graphics object having only two dimensions (e.g., a width along an x-axis and a height along a y-axis) and not having a third dimension (e.g., a depth along a z-axis). The 2D object may be presented on a canvas of a design tool and manipulated using functions of the design tool, including applying 3D transformations to the 2D object.

A "3D transformation" refers to a manipulation to a 2D object or group of 2D objects in a 3D space. In accordance with some configurations, a 3D transformation is applied to a 2D object based on the axes of the 2D object, the origin (i.e., the location at which the axes intersect) of which may be located at the center of the 2D object. 3D transformations to 2D object(s) include rotation of the 2D object(s) around an axis of the 2D object(s) and translation of the 2D object(s) along an axis of the 2D object(s).

A "user interface element" refers to an object presented on a user interface with a 2D object or group of 2D objects for receiving user input to apply a 3D transformation to the 2D object or group of 2D objects. In accordance with some aspects of the present disclosure, a user interface element is a combination of multiple components. Each "component" comprises a portion of the user interface element for causing different 3D transformations to be applied. In some configurations, the user interface element includes three components, the three components including two rotation components for rotating the 2D object(s) around two respective axes of the 2D object(s) and a translation component for translating the 2D object(s) along at least one axis of the 2D object(s). A 3D transformation is applied to the 2D object(s) in response to input selecting one of the components using an input device and relative movement of the input device after selecting the component.

Overview

Graphics designers often want to add depth and dimensionality to their 2D designs. However, existing graphics programs present a number of limitations for applying 3D transformations to 2D graphics. For instance, some 3D graphics programs (e.g., Cinema 4D, 3D Studio Max) use the concept of a freely moving camera that gives designers the freedom to move around in 3D space to position objects. For a 2D graphics design tool, this is too much complexity. Additionally, the 3D transformations applied to 2D objects may permanently alter the objects, thereby impacting the fidelity of the 2D designs. Simpler tools (e.g., Paint 3D, MS PowerPoint) use a fixed plane that cannot be directly or indirectly rotated. This reduces expressiveness. Some graphics programs (e.g., Affinity Designer) support moving and resizing objects along a fixed isometric plane with four presets. The plane cannot be rotated indirectly. Since the planes are fixed, isometric drawing is different from perspective 3D and is for a specific use-case only.

Embodiments of the present invention are directed to a graphics system that addresses these shortcomings of conventional graphics systems by providing for intuitive application of 3D transformations to 2D objects. At a high level, the graphics system presents a user interface element on a 2D object or a group of 2D objects. The user interface element comprises a combination of components that are individually selectable for applying different 3D transformations (including rotation and translation) to the 2D object or group of 2D objects. 3D transformations are applied by selection of a component of the user interface element via an input device and relative movement of the input device after the selection.

In accordance with some configurations, the user interface element includes at least one rotation component and at least one translation component. A rotation component rotates a 2D object or group of 2D objects around an axis. A translation component translates the 2D object or group of 2D objects along an axis. In some aspects, the user interface element includes two rotation components with the first rotation component providing rotation around the y-axis and the second rotation component providing rotation around the x-axis. In some further aspects, the user interface element includes a translation component that provides translation along the z-axis. In further embodiments, the translation component also provides translation along the x-axis. For instance, a 2D object can be translated along the z-axis when an input device is moved in an up-down direction and translated along the x-axis when the input device is moved in a left-right direction.

3D transformations are applied using axes relative to the 2D object or group of 2D objects, as opposed to global axes (e.g., axes relative to the canvas, screen, camera, or otherwise globally-defined axes). When a 2D object or group of 2D objects is rotated around an axis, the axes for the 2D object or group of 2D objects are also rotated. As such, further 3D transformations applied to a rotated 2D object or group of 2D objects are performed using the rotated axes. For instance, if a 2D object is rotated around its y-axis, the rotated 2D object has a correspondingly rotated z-axis. If a z-axis translation is then performed on the rotated 2D object, the translation is performed along the rotated z-axis of the 2D object. Additionally, all editing actions (e.g., drawing, pasting, moving, resizing) occur in the x-y plane of a rotated 2D object or group of 2D objects. For instance, when a 2D object with no rotation is copied and pasted on a rotated 2D object, the pasted 2D object is rotated such that it is in the x-y plane of the rotated 2D object.

In some configurations, the user interface element is presented at the center of a 2D object. Additionally, this is the location of the origin for the 2D object (i.e., the location at which the axes of the 2D object intersect). This provides for the intuitive application of 3D transformations as a selection is made of a component via an input device at the origin of the 2D object and 3D transformations are applied based on the relative movement of the input device after the selection.

Some aspects of the technology described herein do not employ a free-form 3D camera as used in conventional 3D graphics tools. In such conventional graphics systems, perspective is applied at the camera. In contrast, some configurations apply a separate perspective for each individual 2D object and each separate group of 2D objects presented on a canvas of the graphics program. In the case of a group of 2D objects, perspective is set for the root 2D object, and descendant 2D objects have a perspective value of zero set. Additionally, because no camera is used, no 3D manipulations are applied that permanently alter the 2D objects. Instead, when 3D transformations are applied using the technology described herein, the 2D objects can always be manipulated again such that they look like normal 2D objects. This maintains the fidelity of the original 2D designs.

Example Graphics Design System for Applying 3D Transformations to 2D Objects

With reference now to the drawings, FIG. 1 is a block diagram illustrating an exemplary graphics design system for applying 3D transformations to 2D objects in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with a graphics design tool 110 hosted by a server 104. Each of the user device 102 and server 104 shown in FIG. 1 can comprise one or more computer devices, such as the computing device 1100 of FIG. 11, discussed below. As shown in FIG. 1, the user device 102 and the server 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the server 104 could be provided by multiple server devices collectively providing the functionality of the graphics design tool 110 as described herein. Additionally, other components not shown may also be included within the network environment.

The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the graphics design tool 110 on the server 104. The application 108 can be, for instance, a web browser or a dedicated application for providing graphics design functions, such as those described herein.

At a high level, the graphics design tool 110 includes modules to generate and manipulate 2D objects, including applying 3D transformations to the 2D objects. As shown in FIG. 1, the components of the graphics design tool 110 include a user interface module 112, a rotation module 114, a translation module 116, and an editing module 118. These components may be in addition to other components that provide further graphics processing features beyond the features described herein.

The graphics design tool 110 can be implemented using one or more server devices (such as the server 104), one or more platforms with corresponding application programming interfaces, cloud infrastructure, and the like. While the graphics design tool 110 is shown on a server 104 separate from the user device 102 in the configuration of FIG. 1, it should be understood that in other configurations, some or all of the functions of the graphics design tool 110 can be provided on the user device 102. In some configurations, the server 104 is not necessary as all graphics processing functions are provided locally on the user device 102, for instance, by the application 108.

The user interface module 112 of the graphics design tool 110 generally provides a user interface for generating graphics designs. In accordance with some configurations, the user interface includes a canvas presenting 2D objects and tools for manipulating and editing the 2D objects on the canvas. In accordance with the technology described herein, the user interface module 112 provides a user interface element for intuitively applying 3D transformations to a 2D object or a group of 2D objects.

Figure 2:
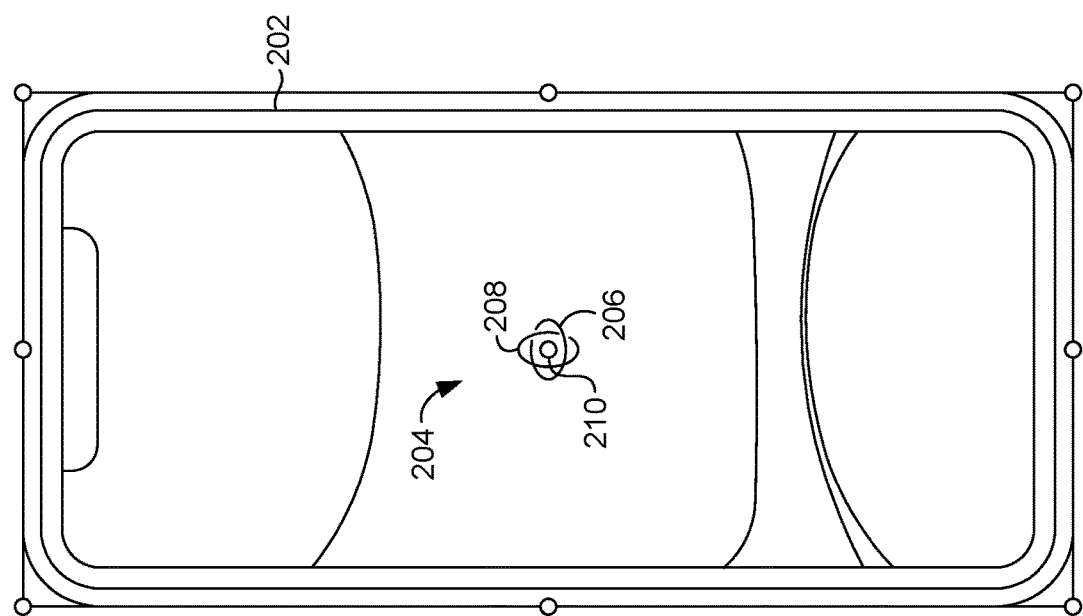
FIG. 2 is a diagram showing a 2D object with a user interface element for applying 3D transformations to the 2D object in accordance with some implementations of the present disclosure.

By way of illustration, FIG. 2 provides a diagram showing a 2D object 202 with a user interface element 204 for applying 3D transformations to the 2D object 202. As shown in FIG. 2, the user interface element 204 includes three individually-selectable components, including a first rotation component 206 for rotating the 2D object 202 around a first axis, a second rotation component 208 for rotating the 2D object 202 around a second axis, and a translation component 210 for translating the 2D object 202 along at least a third axis. As will be described in further detail below, in some configurations, the first rotation component 206 provides for rotating the 2D object 202 around its y-axis, the second rotation component 208 provides for rotating the 2D object 202 around its x-axis, and the translation component 210 provides for translating the 2D object 202 along its z-axis and/or its x-axis.

Each of the components 206, 208, 210 are individually selectable via an input device to receive input for applying 3D transformations to the 2D object 202. Any input device can be used to interact with the user interface element 204, including, for instance, a mouse, a digital stylus or pen, a touch screen, or a natural user interface (NUI). In some configurations, an input device can be used to initially interact with the user interface element 204 to select one of the components 206, 208, 210. For instance, a mouse may be used to hover a mouse pointer over one of the components 206, 208, 210. In response, the user interface element 204 may be modified to show a selected component. For instance, the selected component may be modified (e.g., highlighted or presented with a different shape) and/or the other components may be removed from the user interface element 204.

In some configurations, the user interface element is presented at the center of a 2D object. For instance, in FIG. 2, the user interface element 204 is presented at the center of the 2D object 202. The center of the 2D object may also correspond with the location at which the axes of the 2D object intersect (i.e., the origin of the 2D object). In this way, interaction with the user interface element to apply a 3D transformation to the 2D object is intuitive. In other words, a 3D transformation is applied to a 2D object via an input device selecting a component of the user interface element at the center of the 2D object and movement of the input device from that selection point. The extent of the 3D transformation applied to the 2D object is based on how much movement of the input device from the center of the 2D object has occurred.

The rotation module 114 of the graphics tool 110 controls rotation of 2D objects. In accordance with some configurations, the location at which the axes of a 2D object intersect is located at the center of the 2D object. As such, rotation around an axis is applied around the center of a 2D object. The extent of a rotation applied to a 2D object is relative to the existing rotation value for the 2D object and based on how much movement of an input device has occurred after selecting a rotation component of a user interface element for the 2D object. Based on such input, the rotation module 114 computes a transformation matrix to apply the rotation to the 2D object.

In instances in which a rotation has been applied to a 2D object around a first axis, the axes of the 2D object are rotated. As such, if rotation is applied to the 2D object around a second axis, the rotation is applied around the rotated second axis. For instance, if a 2D object is rotated around its y-axis, the x-axis of the 2D object is rotated. As such, if rotation is then applied around the x-axis of the 2D object, the rotation is applied around the rotated x-axis of the 2D object (e.g., as opposed to applying the rotation around the x-axis of the canvas). Similarly, if a 2D object is rotated around its x-axis, the y-axis of the 2D object is rotated. If rotation is then applied around the y-axis of the 2D object, the rotation is applied around the rotated y-axis of the 2D object.

In conventional 3D graphics tools, a camera and view matrix are used to provide full control over how objects are viewed. The camera and view matrix involve transforms applied to objects to allow for different views of objects.

However, the camera and view matrix add complexity in using the 3D graphics tools. Some configurations of the technology described herein do not employ a camera or a view matrix used in traditional 3D graphics tools. This removes the complexity involved with such tools. For instance, some configurations of the technology described herein provide a 2D design tool that presents a 2D view of the scene/canvas in which a user can pan the view in a global x-y plane but can't move the view in a global z direction.

Because some configurations don't use a camera or view matrix, transformations are done locally on 2D objects. This includes applying a perspective transform locally to a 2D object as opposed to applying the perspective transform globally at the camera as in conventional 3D graphics tools. The perspective transform controls how objects are scaled and skewed when applying 3D transformations. As such, when input is received via a rotation component of a user interface element for a 2D object, the rotation module 114 determines a transformation matrix to apply to rotate the 2D object based on the extent of movement of the input and a perspective applied locally to the 2D object.

In accordance with some aspects of the technology described herein, 2D objects can be grouped together. Rotations can be applied to individual 2D objects in the group, as well as to the group of 2D objects. When handling a group of 2D objects with 3D transforms applied to various 2D objects in the group, the rotation module 114 does not apply a perspective to each 2D object in the group. Instead, the perspective is only applied to the root 2D object in the group and is an additional perspective is not applied at each child 2D object. As such, perspective is local to a subtree of 2D objects but global to 2D objects in that subtree.

Accordingly, given a tree of 2D objects, each 2D object can have rotation and position represented by a 4×4 3D matrix. Only the root 2D object in the tree has a perspective value set. Descendant 2D objects of the root 2D object has perspective value of 0 set. This ensures that descendant 2D objects of the root 2D object have a sense of depth when changed in z direction or rotated. To compute nested rotations, the rotation module 114 post-concatenates matrices starting from the root to build the total matrix for a given 2D object in the group.

In this way, when there are multiple individual 2D objects (not part of a group) and/or groups of 2D objects on a canvas, each individual 2D object that is not part of a group and each separate group of 2D objects has its own local perspective applied when a 3D transformation is applied to each individual 2D object or separate group of 2D objects.

Figure 3B:
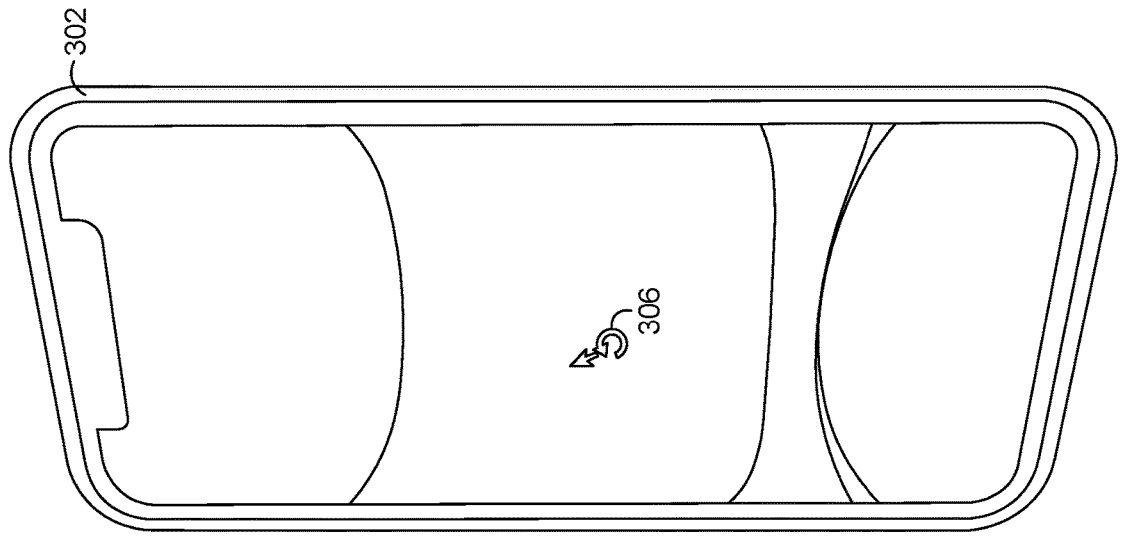
FIGS. 3A and 3B are diagrams showing rotation of a 2D object around a y-axis based on input received via a rotation component of a user interface element on the 2D object in accordance with some implementations of the present disclosure.
Figure 3A:
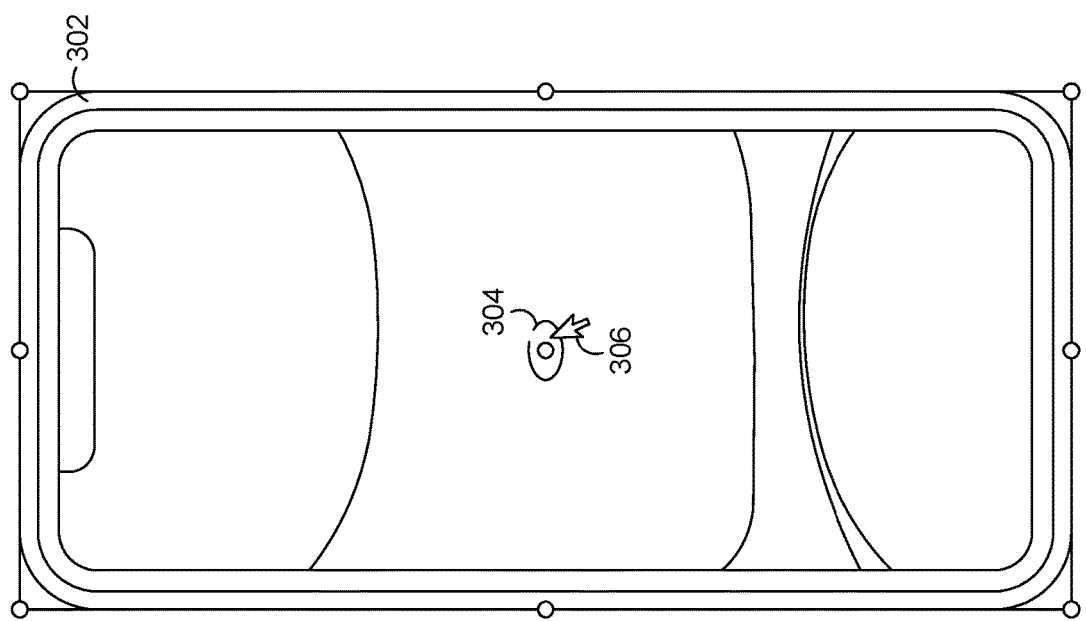

Turning to FIGS. 3A and 3B, rotation of a 2D object 302 around its y-axis using a first rotation component 304 of a user interface element is illustrated. As shown in FIG. 3A, the 2D object 302 is initially presented with no rotation. Although not shown in FIG. 3A, a user interface element with three components, such as the user interface element 204 of FIG. 2, may initially be placed on the 2D object 302. FIG. 3A shows a mouse pointer 306 has been placed on a first rotation component 304 of a user interface element on the 2D object 302. When the mouse pointer 306 is placed on the first rotation component 304 (e.g., hovered over the first rotation component 304), the user interface element is adjusted to show selection of the first rotation component 304, for instance, by removing other components of the user interface element and/or highlighting or otherwise adjusting the presentation of the first rotation component 304. After hovering the mouse pointer 306 over the first rotation component 304, the user may use the mouse to click on the first rotation component 304 and then move the mouse pointer 306 to cause rotation of the 2D object 302 around its y-axis. For instance, as shown in FIG. 3B, the mouse pointer 306 has been moved to the left causing the 2D object 302 to be rotated around its y-axis in one direction. If the mouse pointer 306 is moved to the right, the 2D object 302 would be rotated around its y-axis in the opposite direction.

Figure 4B:
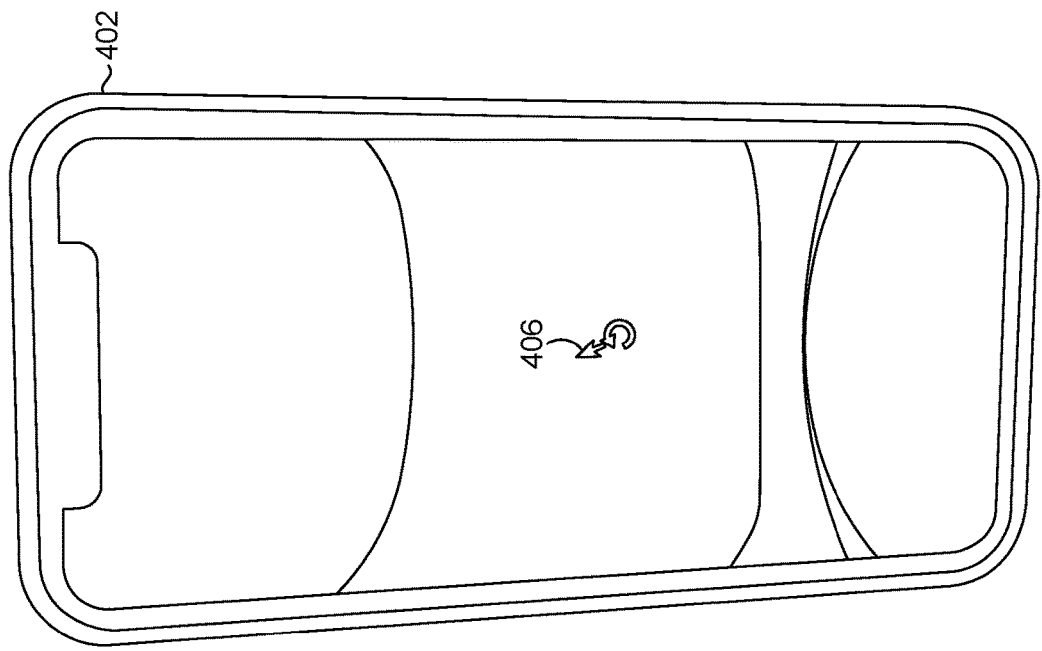
FIGS. 4A and 4B are diagrams showing rotation of a 2D object around an x-axis based on input received via a rotation component of a user interface element on the 2D object in accordance with some implementations of the present disclosure.
Figure 4A:
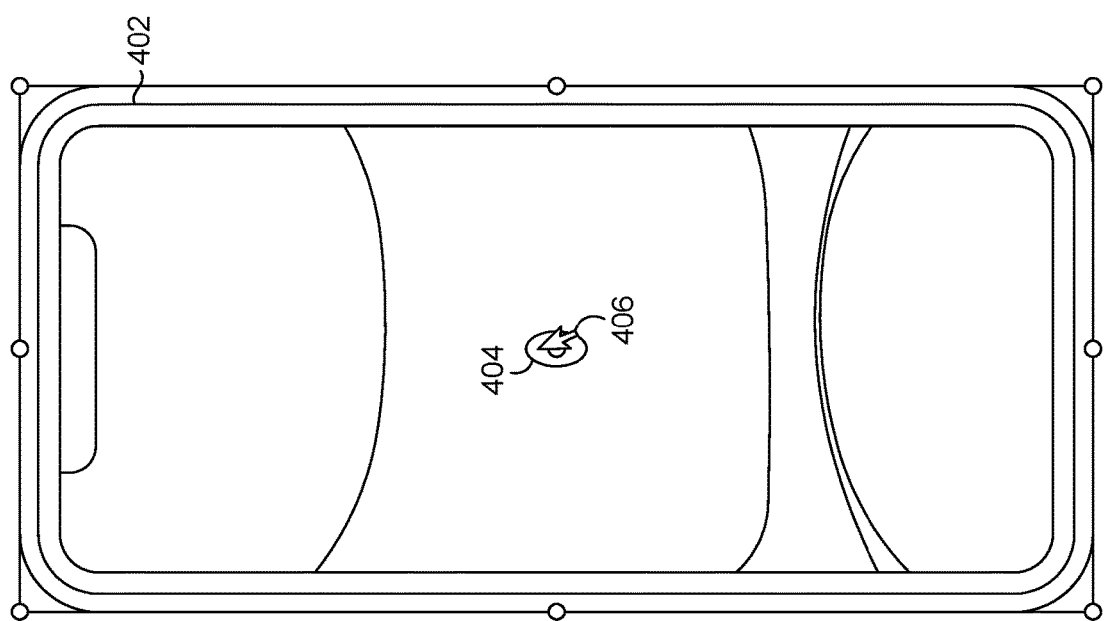

FIGS. 4A and 4B illustrate rotation of a 2D object 402 around its x-axis using a second rotation component 404 of a user interface element. As shown in FIG. 4A, the 2D object 402 is initially presented with no rotation. Although not shown in FIG. 4A, a user interface element with three components, such as the user interface element 204 of FIG. 2, may initially be placed on the 2D object 402. FIG. 4A shows a mouse pointer 406 has been placed on a second rotation component 404 of a user interface element on the 2D object 402. When the mouse pointer 406 is placed on the second rotation component 404 (e.g., hovered over the second rotation component 404), the user interface element is adjusted to show selection of the second rotation component 404, for instance, by removing other components of the user interface element or highlighting and/or otherwise adjusting the presentation of the second rotation component 404. After hovering the mouse pointer 406 over the second rotation component 404, the user may use the mouse to click on the second rotation component 404 and then move the mouse pointer 406 to cause rotation of the 2D object 402 around its x-axis. For instance, as shown in FIG. 4B, the mouse pointer 406 has been moved downward causing the 2D object 402 to be rotated around its x-axis in one direction. If the mouse pointer 406 is moved upward, the 2D object 402 would be rotated around its x-axis in the opposite direction.

Figure 5B:
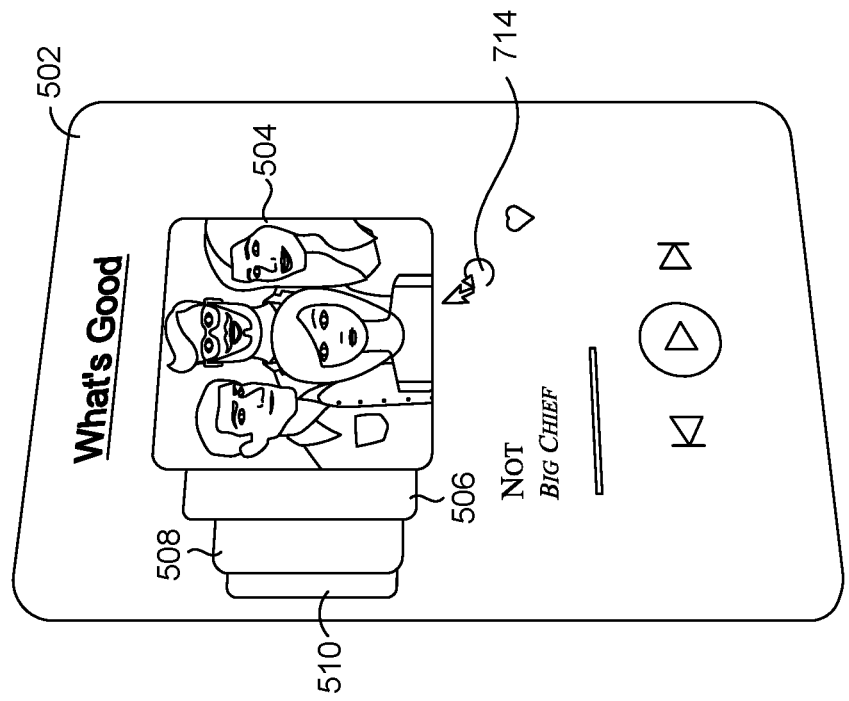
FIGS. 5A and 5B are diagrams showing rotation of a group of 2D objects around a y-axis based on input received via a rotation component of a user interface element for the group of 2D objects in accordance with some implementations of the present disclosure.
Figure 5A:
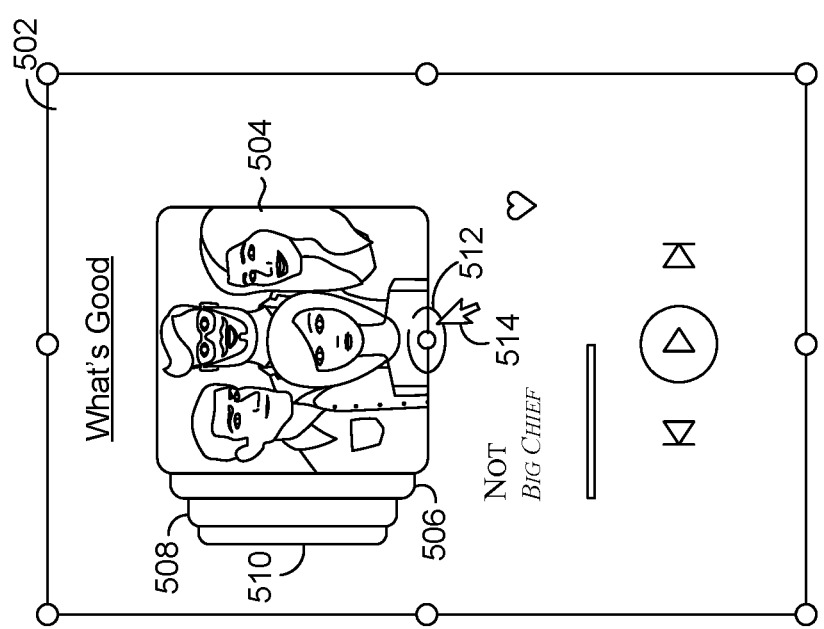

As previous indicated, in some configurations, a group of 2D objects can be selected and 3D transformations may be applied to the selected group of 2D objects. By way of illustration, FIGS. 5A and 5B show rotation of a group of 2D objects, including 2D objects 502, 504, 506, 508, 510, around a y-axis for the group. As shown in FIG. 5A, the 2D objects 502, 504, 506, 508, 510 are initially presented with no rotation. Although not shown in FIG. 5A, a user interface element with three components, such as the user interface element 204 of FIG. 2, may initially be placed on the group of 2D objects 502, 504, 506, 508, 510. FIG. 5A shows a mouse pointer 514 has been placed on a first rotation component 512 of a user interface element. When the mouse pointer 514 is placed on the first rotation component 512 (e.g., hovered over the first rotation component 512), the user interface element is adjusted to show selection of the first rotation component 512, for instance, by removing other components of the user interface element and/or highlighting or otherwise adjusting the presentation of the first rotation component 512. After hovering the mouse pointer 514 over the first rotation component 512, the user may use the mouse to click on the first rotation component 512 and then move the mouse pointer 514 to cause rotation of the group of 2D objects 502, 504, 506, 508, 510 around a y-axis for the group. For instance, as shown in FIG. 5B, the mouse pointer 514 has been moved to the right causing the group of 2D objects 502, 504, 506, 508, 510 to be rotated around the y-axis in one direction. If the mouse pointer 514 is moved to the left, the group of 2D objects 502, 504, 506, 508, 510 would be rotated around the y-axis in the opposite direction.

Referring again to FIG. 1, the translation module 116 of the graphics design tool 110 controls translation of 2D objects. The translation may be based on input received, for instance, via an input device interacting with a translation component of a user interface element as described herein (such as the translation component 210 of the user interface element 204 in FIG. 2). In some configurations, the translation component can be used to move a 2D object along its z-axis based on movement of an input device in an up-down direction relative to the canvas. In further configurations, the translation component can be used to move a 2D object along its x-axis based on movement of an input device in a left-right direction. Movement along both the z-axis and x-axis allows a 2D object to be moved around its x-z plane. This allows 2D objects to be moved behind another and back in one seamless gesture (e.g., without lifting up the mouse button).

When a 2D object is rotated, the axes of the 2D object are also rotated. As such, when input is received via a translation component of a user interface element, the translation module 116 applies the translation along the rotated axes. The translation module takes the rotated plane of a 2D object or group of 2D objects and converts the amount of movement of an input device (e.g., amount of movement of a mouse cursor) from global coordinates (e.g., 2D screen coordinates) to the rotate plane coordinates for the 2D object or group of 2D objects to determine the extent of movement along the x-z plane for the 2D object or group of 2D objects.

As an example to illustrate, consider a tree of graphic objects with root object R, child object A and grandchild object B. Object B can be moved by clicking on a translation component of a user interface element for object B with the mouse and dragging the mouse. The change in mouse movement is recorded as (dx, dy). (dx, dy) is transformed from screen coordinates into distance along object B's rotated x-axis: (dx1, dy1). This is done by using transformation matrices to convert (dx, dy) from screen's coordinate system into object B's local coordinate system. The math for this transformation involves inverting the screen/viewport total matrix, then transforming the result with the inverse of total matrix of object A. A matrix translation is applied to the local 3D transform by (dx1, 0, dy1). To a user perceiving the rendered result of these graphical objects, it appears as if object B is moving along object A's rotated plane the optimal amount.

Figure 6B:
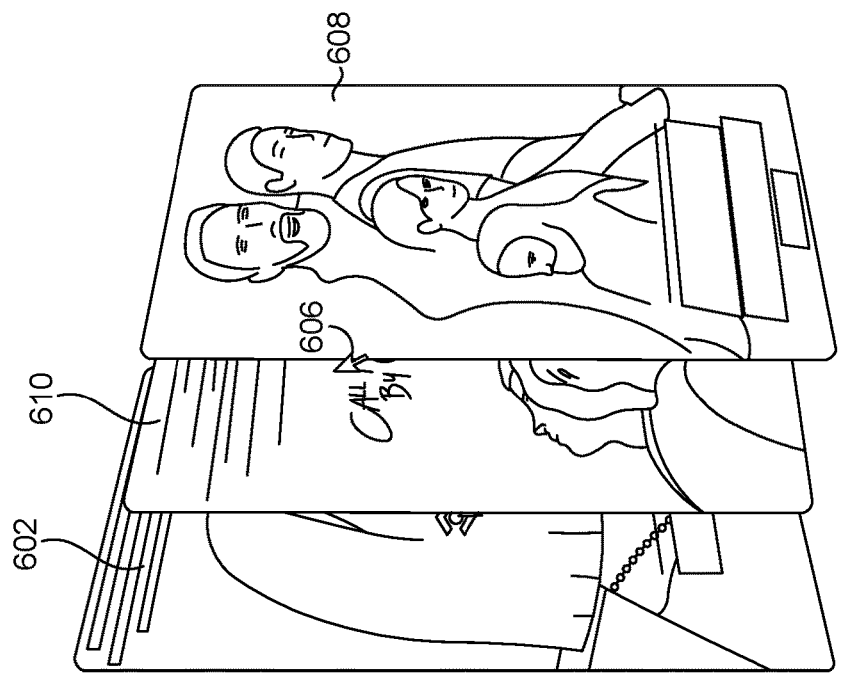
FIGS. 6A and 6B are diagrams showing translation of a 2D object along a z-axis based on input received via a translation component of a user interface element on the 2D object in accordance with some implementations of the present disclosure.
Figure 6A:
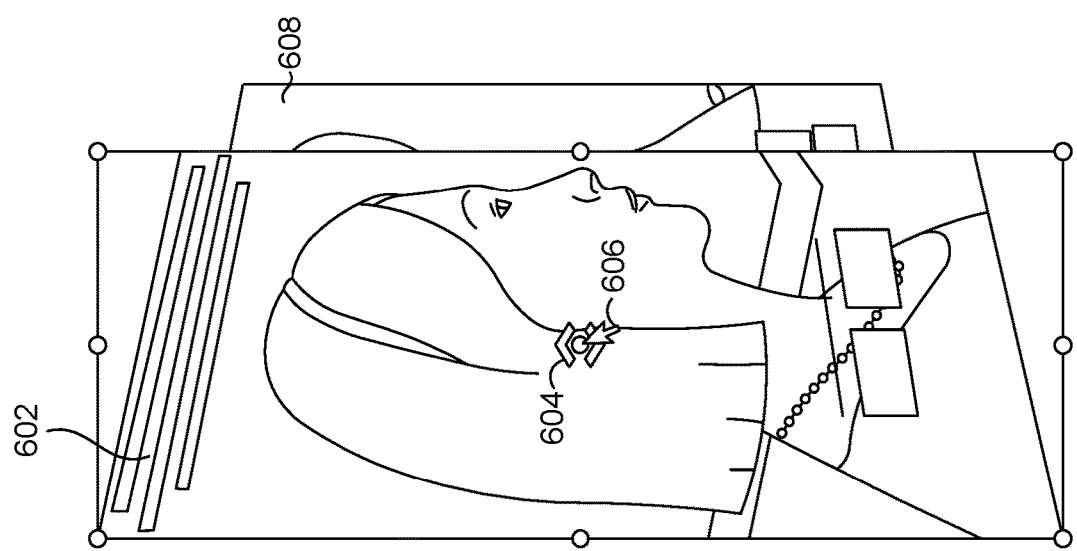

Translation of a 2D object along its z-axis is illustrated in FIGS. 6A and 6B. As shown in FIG. 6A, a 2D object 602 has initially been rotated around its y-axis and is shown with other 2D objects, including 2D object 608. Although not shown in FIG. 6A, when the 2D object 602 is selected, a user interface element with three components, such as the user interface element 204 of FIG. 2, is presented on the 2D object 602. FIG. 6A shows a mouse pointer 606 has been placed on a translation component 604 of the user interface element. When the mouse pointer 606 is placed on the translation component 604 (e.g., hovered over the translation component 604), the user interface element is adjusted to show selection of the translation component 604, for instance, by removing other components of the user interface element and/or highlighting or otherwise adjusting the presentation of the translation component 604. After hovering the mouse pointer 606 over the translation component 604, the user may use the mouse to click on the translation component 604 and then move the mouse pointer 606 to cause translation of the 2D object 602 along its z-axis. For instance, as shown in FIG. 6B, the mouse pointer 606 has been moved upward causing the 2D object 602 to be translated along its z-axis in one direction (backwards) such that the 2D object 602 is now behind the 2D objects 608, 610. If the mouse pointer 606 is moved downward, the 2D object 602 would be translated along its z-axis in the opposite direction (forwards). As can be seen from FIGS. 6A and 6B, because the 2D object 602 has been rotated around its y-axis, the z-axis of the 2D object 602 is rotated, and as such, the 2D object 602 is translated along the rotated z-axis as opposed to the z-axis of the canvas. The final back to front order when drawing objects is determined by first sorting all objects in their value along the z-axis, and if objects have the same z-value, using the order in which objects were created (index of the object) to tie-break.

Figure 7B:
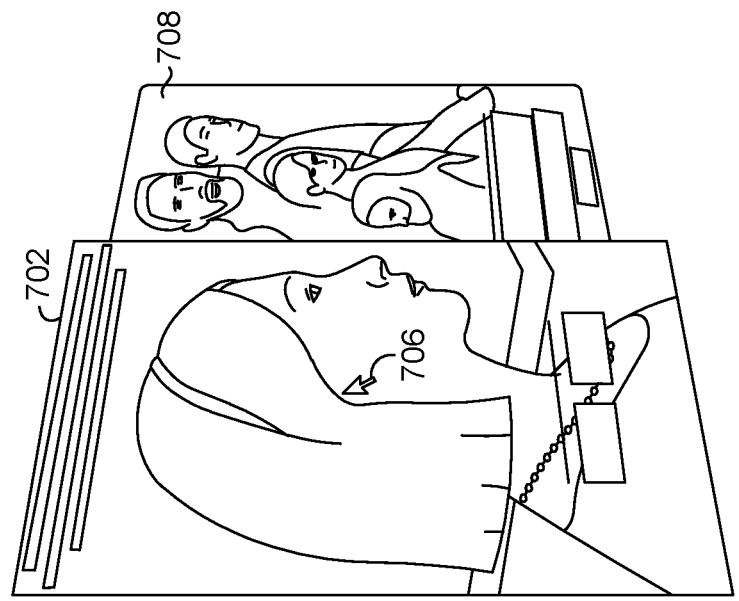
FIGS. 7A and 7B are diagrams showing translation of a 2D object along an x-axis based on input received via a translation component of a user interface element on the 2D object in accordance with some implementations of the present disclosure.
Figure 7A:
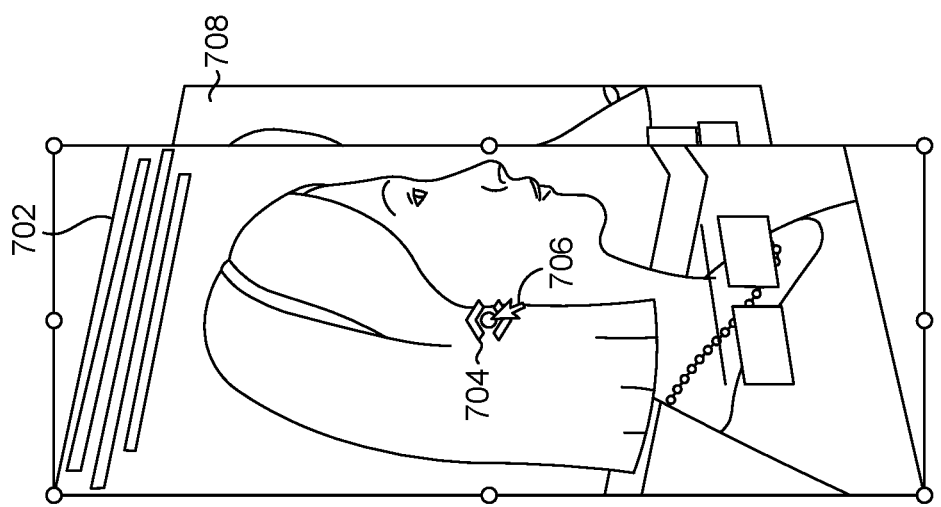

FIGS. 7A and 7B illustrate translation of a 2D object along its x-axis. Similar to FIG. 6A, FIG. 7A shows a 2D object 702 has initially been rotated around its y-axis and is shown with other 2D objects, including 2D object 708. Although not shown in FIG. 7A, when the 2D object 702 is selected, a user interface element with three components, such as the user interface element 204 of FIG. 2, is presented on the 2D object 702. FIG. 7A shows a mouse pointer 706 has been placed on a translation component 704 of the user interface element. When the mouse pointer 706 is placed on the translation component 704 (e.g., hovered over the translation component 704), the user interface element is adjusted to show selection of the translation component 704, for instance, by removing other components of the user interface element and/or highlighting or otherwise adjusting the presentation of the translation component 704. After hovering the mouse pointer 706 over the translation component 704, the user may use the mouse to click on the translation component 704 and then move the mouse pointer 706 to cause translation of the 2D object 702 along its x-axis. For instance, as shown in FIG. 7B, the mouse pointer 706 has been moved to the left causing the 2D object 702 to be translated along its x-axis in one direction. If the mouse pointer 706 is moved to the right, the 2D object 702 would be translated along its x-axis in the opposite direction. As can be seen from FIGS. 7A and 7B, because the 2D object 702 has been rotated around its y-axis, the x-axis of the 2D object 702 is rotated, and as such, the 2D object 702 is translated along the rotated x-axis as opposed to the x-axis of the canvas.

While FIGS. 6A, 6B, 7A, and 7B illustrate separate translation of a 2D object along the 2D objects' z-axis and x-axis, it should be understood that in some configurations, continuous movement of an input device may cause translation along both axes, for instance, based on up/down and left/right movement of the input device (i.e., dx, dy). Given a 2D object, the final 3D transform is computed by performing the following transformation operations on the transformation matrix in the following order: translateXY(bounds.center), rotateZ(rotationZ), rotateY(rotationY), rotateX(rotationX), translateZ(z), translateXY(-bounds.center) where bounds.center is the center of the 2D object without any 3D transforms. Additionally perspectiveZ field of the transformation matrix will be set to −1/depth where depth is a constant with value 800 if the object is the first object in the hierarchy of objects that has a 3D transform applied to it.

With reference again to FIG. 1, the editing module 118 of the graphics design tool 110 controls edit actions. In particular, edit actions for a rotated 2D object are applied relative to the rotated x-y plane of the 2D object. In other words, when a 2D object is rotated, this changes the plane on which edit actions are performed such that the edit actions are done in the plane of the rotated 2D object as opposed to the plane of the canvas or screen. This could include any edit action, such as, for instance, pasting, drawing a new object, moving, and resizing, to name a few.

Figure 8A:
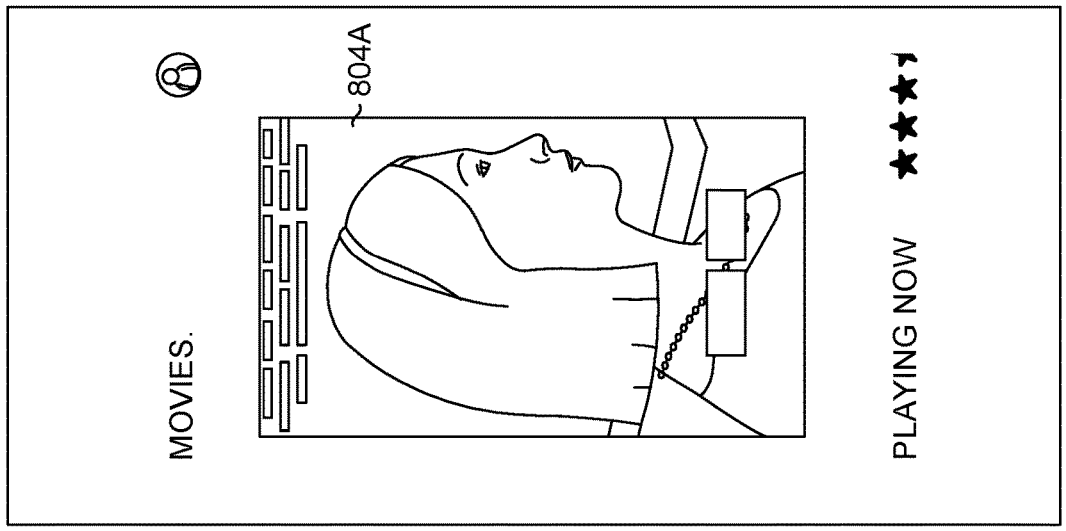
FIGS. 8A and 8B are diagrams showing copying 2D objects and pasting the 2D objects in the rotated x-y plane of a rotated 2D object in accordance with some implementations of the present disclosure.
Figure 8A:
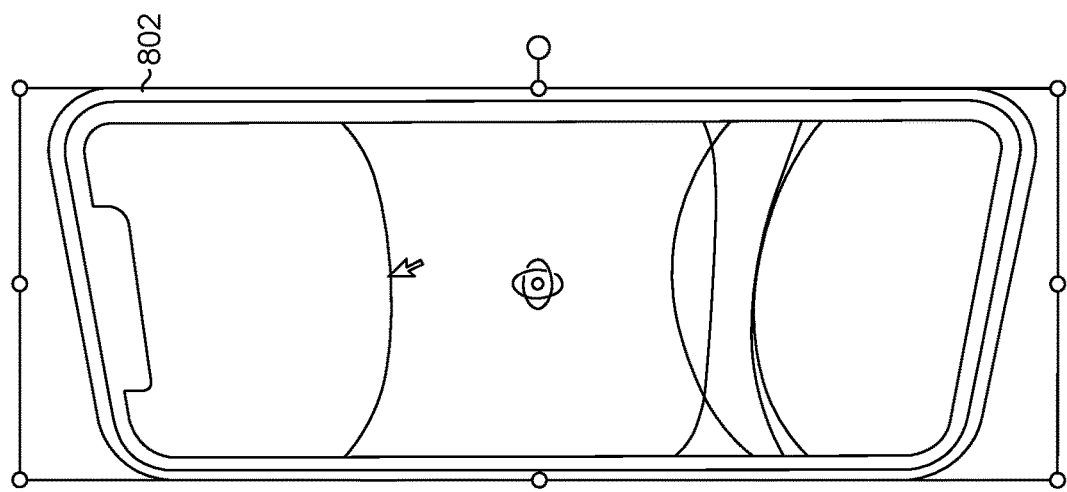
Figure 8B:
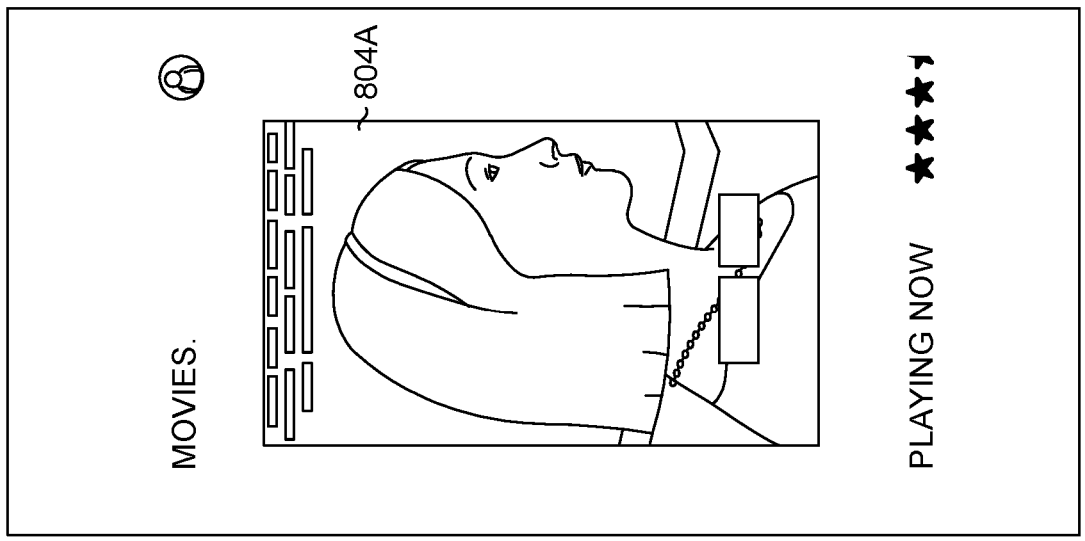
Figure 8B:
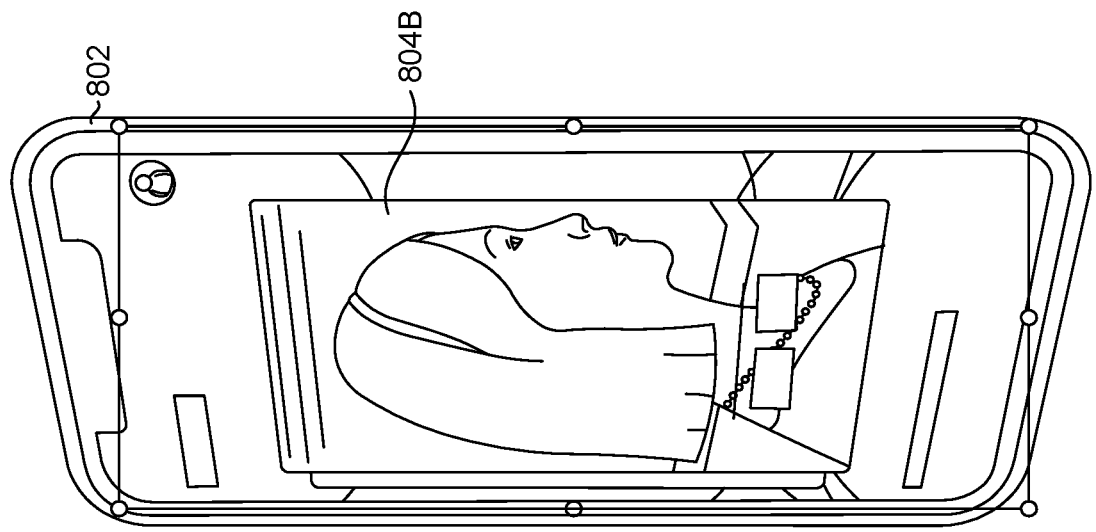

FIGS. 8A and 8B illustrate a copy and paste operation in the x-y plane of a rotated 2D object. As shown in FIG. 8A, the 2D object 802 has been rotated along its y-axis such that the 2D object 802 has a rotated x-y plane. A group of 2D objects that includes a second 2D object 804A is also shown on the canvas in FIG. 8A. The group of 2D objects that includes the 2D object 804A has not been rotated. FIG. 8B shows the result of a copy and paste action, in which the group of 2D objects that includes the 2D object 804A has been copied and pasted on the 2D object 802. As can be seen in FIG. 8B, the group of 2D objects that includes the 2D object 804B has been pasted such that each of the pasted 2D objects is rotated and positioned in the x-y plane of the 2D object 804A.

Figure 9:
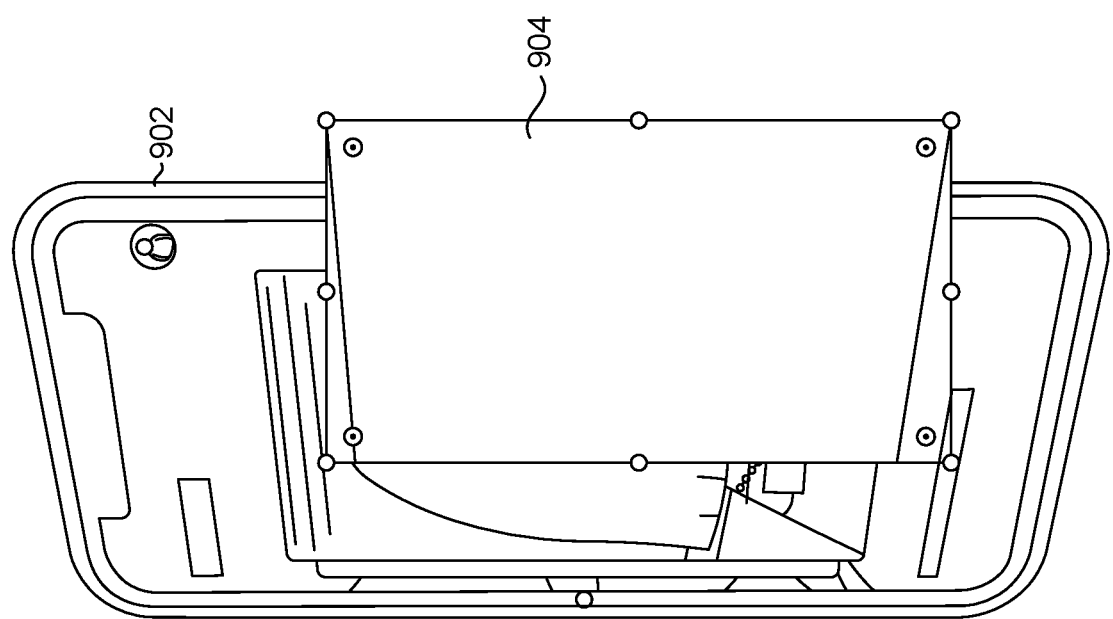
FIG. 9 is a diagram showing generation of a new 2D object in the rotated x-y plane of a rotated 2D object in accordance with some implementations of the present disclosure

FIG. 9 illustrates an example of creating a new 2D object in the x-y plane of a rotated object. As shown in FIG. 9, the 2D object 902 has been rotated along its y-axis thereby rotating the x-y plane of the 2D object 904. When a new 2D object 904 is created, the new 2D object 904 is generated such that it is rotated and positioned in the x-y plane of the 2D object 902.

Example Method for Applying 3D Transformations to 2D Objects

Figure 10:
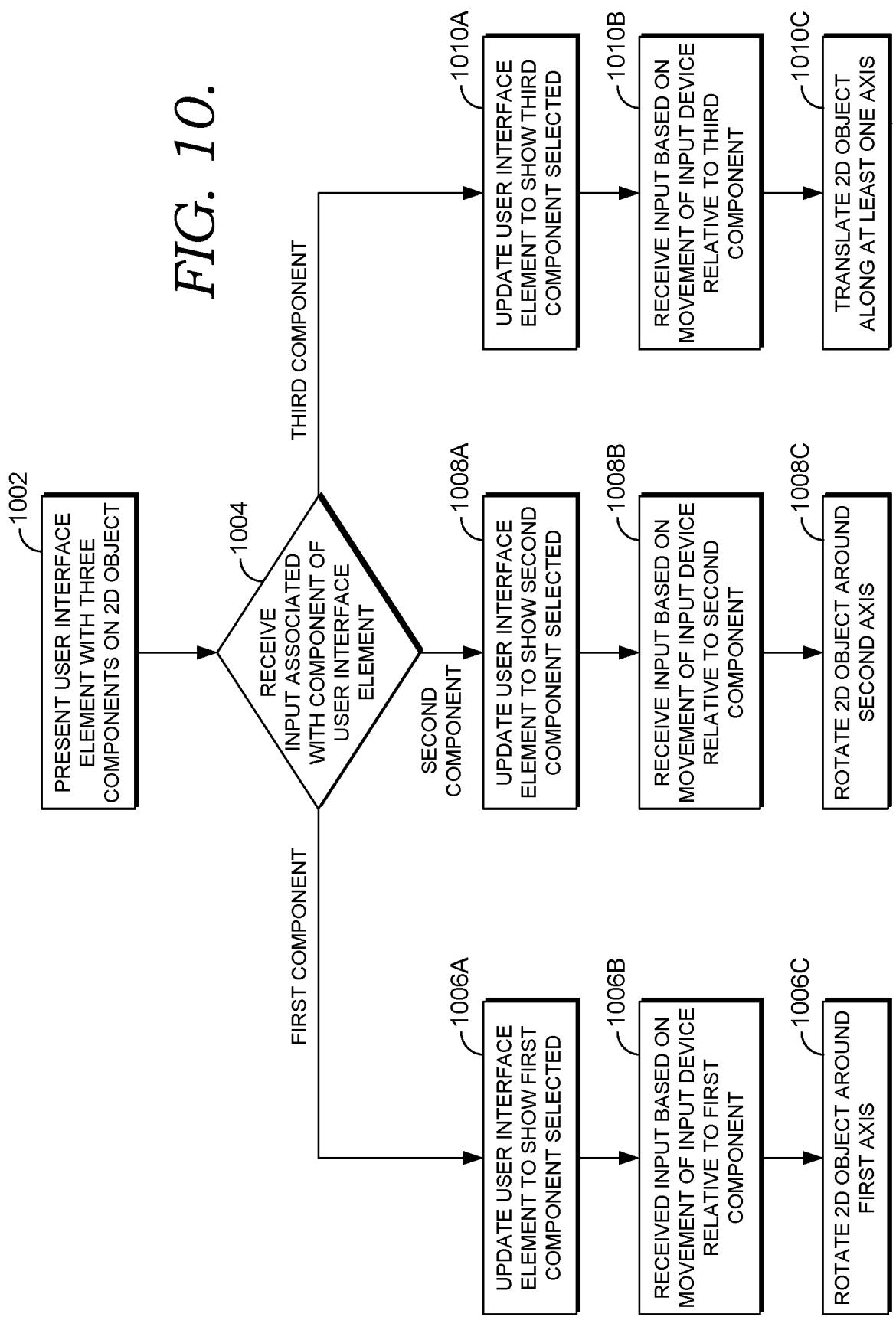
FIG. 10 is a flow diagram showing a method for performing 3D transformations on a 2D object in accordance with some implementations of the present disclosure.

With reference now to FIG. 10, a flow diagram is provided that illustrates a method 1000 for applying 3D transformations to a 2D object based on input received via a user interface element. The method 1000 may be performed, for instance, by the graphics design tool 110 of FIG. 1. While the method 1000 is described with reference to applying 3D transformations to a single object, it should be understood that the process can also apply 3D transformations to a group of 2D objects. Each block of the method 1000 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 1002, a user interface element with three components is presented on a 2D object. In some configurations, the user interface element is presented at the center of the 2D object, which also corresponds to the location at which the axes of the 2D object intersect. Input associated with a component of the user interface element is received at block 1004. The input may be based on an input device, such as a mouse, a digital stylus or pen, a touch screen, or a natural user interface (NUI). For instance, a mouse pointer may be positioned such that it hovers over a component of the user interface element.

When the input is associated with the first component of the user interface element, the process continues to block 1006A at which the user interface element is updated to show the first component selected. For instance, when a mouse pointer is hovered over the first component, the first component may be highlighted or otherwise visually altered and/or the other components of the user interface element may be removed.

As shown at block 1006B, input is received based on movement of the input device. For instance, in the case in which the input device is a mouse, a mouse button may be clicked and held to select the first component, and the mouse may be moved. In response to the input received at block 1006B, the 2D object is rotated around a first axis of the 2D object, as shown at block 1006C. In some configurations, the first axis is the y-axis of the 2D object. The extent of the rotation is based on the movement of the input device after selecting the first component.

When the input is associated with the second component of the user interface element, the process continues at block 1008A at which the user interface element is updated to show the second component selected. For instance, when a mouse pointer is hovered over the second component, the second component may be highlighted or otherwise visually altered and/or the other components of the user interface element may be removed.

As shown at block 1008B, input is received based on movement of the input device. For instance, in the case in which the input device is a mouse, a mouse button may be clicked and held to select the second component, and the mouse may be moved. In response to the input received at block 1008B, the 2D object is rotated around a second axis of the 2D object, as shown at block 1008C. In some configurations, the second axis is the x-axis of the 2D object. The extent of the rotation is based on the movement of the input device after selecting the second component.

When the input is associated with the third component of the user interface element, the process continues at block 1010A at which the user interface element is updated to show the third component selected. For instance, when a mouse pointer is hovered over the third component, the third component may be highlighted or otherwise visually altered and/or the other components of the user interface element may be removed.

As shown at block 1010B, input is received based on movement of the input device. For instance, in the case in which the input device is a mouse, a mouse button may be clicked and held to select the third component, and the mouse may be moved. In response to the input received at block 1010B, the 2D object is translated along at least one axis of the 2D object, as shown at block 1010C. In some configurations, the 2D object is translated along its z-axis when the input device is moved in an up-down direction. In some configurations, the 2D object is additionally or alternatively translated along its x-axis when the input device is moved in a left-right direction. The 2D object may be simultaneously translated along both its z-axis and x-axis, for instance, when the input device is moved diagonally. The extent of the translation is based on the movement of the input device after selecting the third component.

As can be understood, any combinations of 3D transformations (rotation and/or translation) can be applied to the 2D object using the three components of the user interface element using the method 1010. When a rotation is applied to the 2D object, the axes of the 2D object are rotated. As such, when subsequent 3D transformations are applied to the 2D object, the 3D transformations are applied based on the rotated axes. Similarly, when a 2D object is translated along an axis, the axes of the 2D object are translated. As such, when subsequent 3D transformations are applied to the 2D object, the 3D transformations are applied based on the translated axes.

Exemplary Operating Environment

Having described implementations of the present disclosure, an exemplary operating environment in which embodiments of the present invention may be implemented is described below in order to provide a general context for various aspects of the present disclosure. Referring initially to FIG. 11 in particular, an exemplary operating environment for implementing embodiments of the present invention is shown and designated generally as computing device 1100.

Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   causing presentation of a user interface element on a two-dimensional (2D) object, the user interface element comprising a set of components, the set of components including a first component providing rotation of the 2D object around a first axis, a second component providing rotation of the 2D object around a second axis, and a third component providing translation of the 2D object along a third axis; and
   responsive to receiving a set of inputs associated with the set of components, applying a set of 3D transformations to the 2D object by at least:
      applying a first transformation to the 2D object by at least rotating the 2D object around the first axis based on a first input of the set of inputs and a perspective applied locally to the 2D object; and
      applying a second transformation to the 2D object by at least translating the 2D object along the third axis, where the third axis is associated with a z-axis.

2. The one or more computer storage media of claim 1, wherein the first axis comprises a y-axis of the 2D object.

3. The one or more computer storage media of claim 2, wherein the second axis comprises an x-axis of the 2D object.

4. The one or more computer storage media of claim 3, wherein the z-axis is associated with the 2D object.

5. The one or more computer storage media of claim 1, wherein the user interface element is located at a center of the 2D object, and wherein an origin of the 2D object is located at the center of the 2D object.

6. The one or more computer storage media of claim 1, wherein the first input comprises a selection of the first component via an input device and movement of the input device after the selection.

7. The one or more computer storage media of claim 1, wherein the 2D object is a descendant object in a group of 2D objects, and wherein rotating the 2D object around the first axis comprises:
   setting a perspective value for a root object in the group of 2D objects;
   setting a perspective value for the 2D object to zero; and
   building a total matrix for the 2D object by post-concatenating matrices starting with the root object.

8. The one or more computer storage media of claim 1, wherein the third component also provides translation of the 2D object along the second axis.

9. The one or more computer storage media of claim 1, wherein the second input comprises a selection of the third component via an input device and movement of the input device after the selection.

10. The one or more computer storage media of claim 1, wherein rotation of the 2D object around the first axis responsive to the first input results in rotation of the third axis, and
   wherein translating the 2D object along the third axis responsive to the second input comprises translating the 2D object along the rotated third axis.

11. A computerized method comprising:
   causing, by a user interface module presentation of a user interface element on a two-dimensional (2D) object, the user interface element comprising a rotation component and a translation component, the rotation component providing rotation of the 2D object around a first axis, and the translation component providing translation of the 2D object along a second axis; and
   applying a set of 3D transformations to the 2D object based on a set of inputs associated with the rotation component by at least:
      rotating, by a rotation module, the 2D object around the first axis in response to a first input of the set of inputs, wherein the rotation of the 2D object is based on the first input and a perspective applied locally to the 2D object; and
      translating, by a translation module, the 2D object along the second axis in response to a second input of the set of inputs, wherein the second axis is associated with a z-axis of the 2D object.

12. The computerized method of claim 11, wherein the first axis comprises a y-axis of the 2D object.

13. The computerized method of claim 11, wherein the first axis comprises an x-axis of the 2D object.

14. The computerized method of claim 11, wherein rotating around the first axis causes the second axis to be rotated.

15. The computerized method of claim 11, wherein the user interface element comprises a second rotation component providing rotation of the 2D object around a third axis.

16. A computer system comprising:
   a processor; and
   a computer storage medium storing computer-useable instructions that, when used by the processor, causes the computer system to:
      cause, by a user interface module, presentation of a user interface element on a two-dimensional (2D) object, the user interface element comprising a rotation component providing rotation of the 2D object around a first axis and a translation component providing translation of the 2D object along a second axis;
      applying a set of 3D transformations to the 2D object based on a set of inputs associated with the rotation component by at least:
         rotate, by a rotation module, the 2D object around the first axis in response to a first input of the set of inputs, wherein the rotation of the 2D object is based on the first input and a perspective applied locally to the 2D object, rotation of the 2D object around the first axis causing the 2D object to have a rotated x-y plane;
         translate, by a translation module, the 2D object along the second axis in response to a second input of the set of inputs, wherein the second axis is associated with a z-axis of the 2D object
      perform, by an editing module, an edit action in the rotated x-y plane of the 2D object.

17. The computer system of claim 16, wherein the edit action comprises a paste action, a drawing action, a move action, or a resize action.

18. The computer system of claim 16, wherein rotation of the 2D object causes the z-axis of the 2D object to be rotated.

19. The computer system of claim 16, wherein rotation of the 2D object around the first axis further causes the second axis to be rotated to generate a rotated second axis.

20. The computer system of claim 16, wherein translating the 2D object further comprises translating along the rotated second axis.

* * * * *